United States Patent [19]

Buswell et al.

[11] 4,098,588
[45] Jul. 4, 1978

[54] MULTI-TUBE CATALYTIC REACTION APPARATUS

[75] Inventors: Richard F. Buswell, Glastonbury; Richard A. Sederquist, Newington; Daniel J. Snopkowski, Wethersfield, all of Conn.

[73] Assignee: United Technologies Corporation, Hartford, Conn.

[21] Appl. No.: 827,802

[22] Filed: Aug. 25, 1977

Related U.S. Application Data

[63] Continuation-in-part of Ser. No. 753,334, Dec. 22, 1976, abandoned.

[51] Int. Cl.² ................ B01J 7/00; B01J 8/06
[52] U.S. Cl. ................ 48/94; 23/277 R; 23/288 M; 165/142; 165/171
[58] Field of Search ........ 48/93, 94, 95, 196 A, 48/105, 214 A; 252/373; 423/651, 652, 653, 654; 23/288 K, 288 H, 288 M, 288 R, 277 R, 289; 165/154, 155, 142, 134; 122/367 PF

[56] References Cited

U.S. PATENT DOCUMENTS

| | | | |
|---|---|---|---|
| 3,215,502 | 11/1965 | Korwin | 23/277 R |
| 3,475,135 | 10/1969 | Gargominy | 48/94 |
| 3,541,729 | 11/1970 | Dantowitz | 48/94 |
| 3,907,026 | 9/1975 | Mangus | 165/134 |
| 3,909,299 | 9/1975 | Corrigan | 48/94 |

Primary Examiner—S. Leon Bashore
Assistant Examiner—Peter F. Kratz
Attorney, Agent, or Firm—Stephen E. Revis

[57] ABSTRACT

Compact reaction apparatus, such as apparatus for steam reforming a hydrocarbon feedstock to produce hydrogen, comprises a plurality of tubular reactors vertically disposed and closely packed within a furnace. The furnace is divided into an enhanced heat transfer portion and a burner cavity. Each of the several reactors is disposed partly within the burner cavity and partly within the enhanced heat transfer portion. Heat transfer means, such as particles of a heat transfer packing material, is disposed within the enhanced heat transfer portion of the furnace and is constructed and arranged to provide substantially uniform and enhanced conductive, convective, and radiant heating of that portion of the reactors disposed within the heat transfer portion.

6 Claims, 6 Drawing Figures

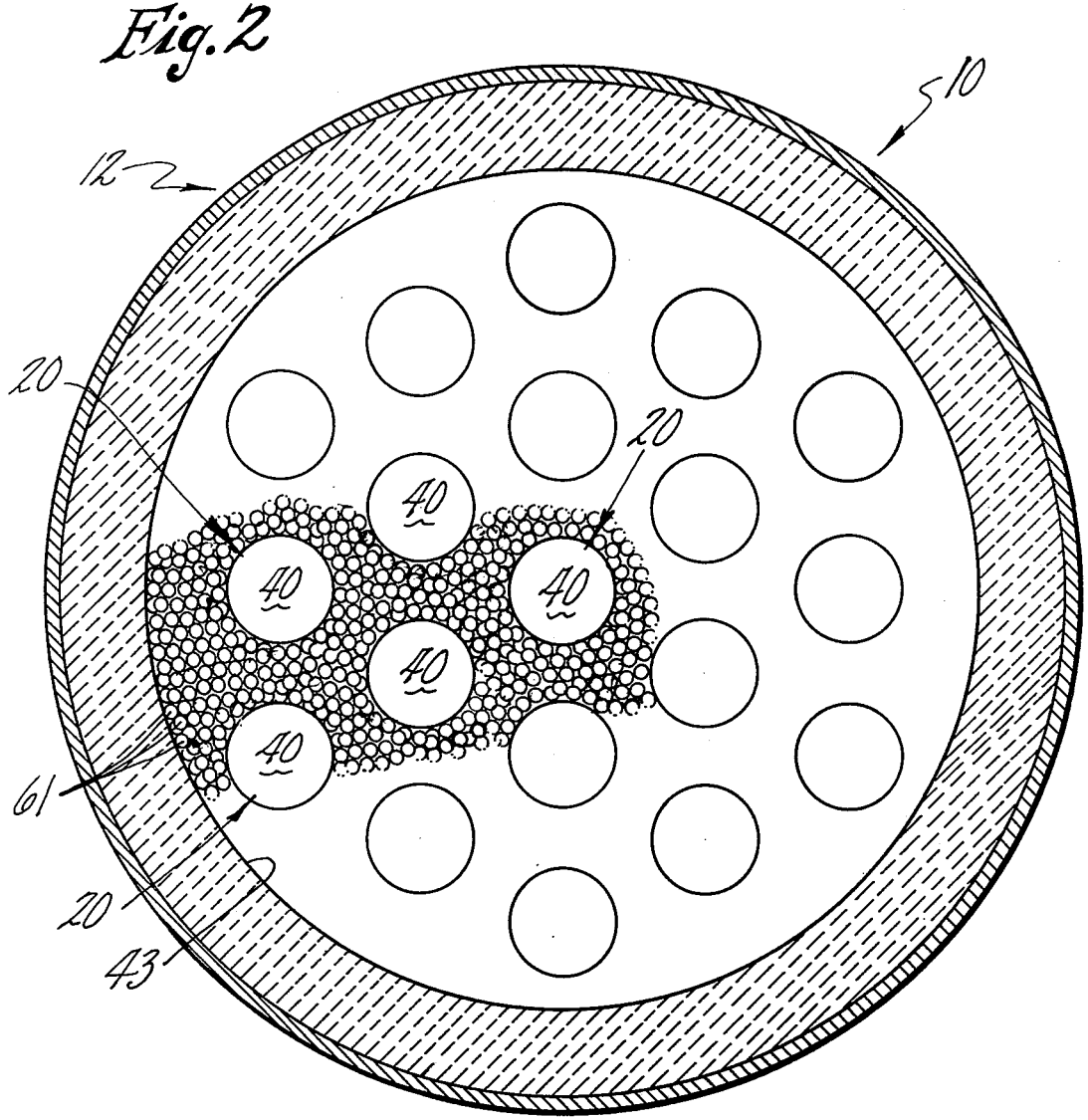

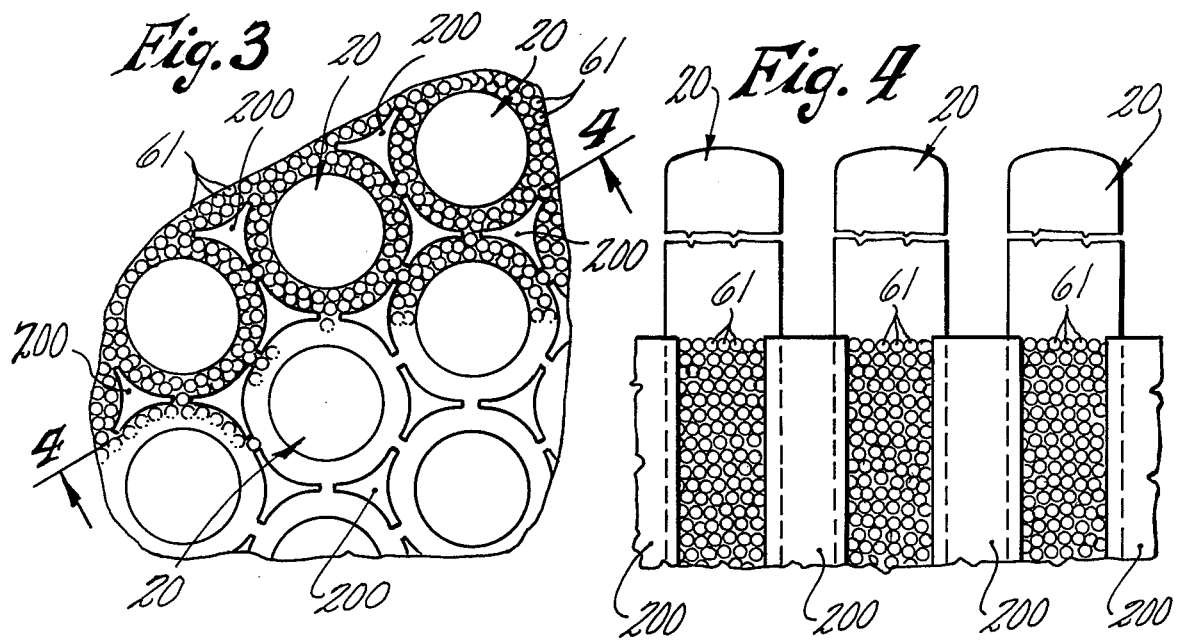
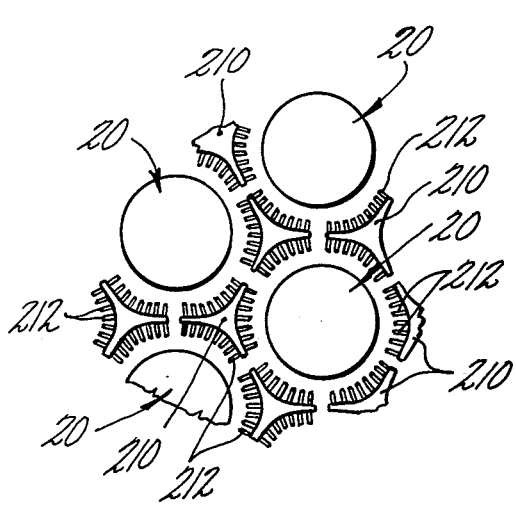
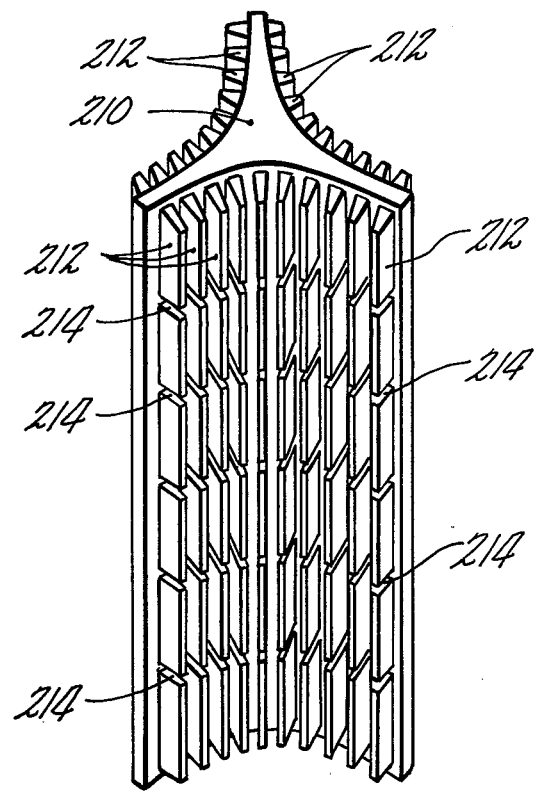

MULTI-TUBE CATALYTIC REACTION APPARATUS

BACKGROUND OF THE INVENTION

This application is a continuation-in-part of co-pending application Ser. No. 753,334, filed Dec. 22, 1976, now abandoned.

1. Field of the Invention

This invention relates to reaction apparatus such as catalytic reaction aparatus for producing product gases from a feedstock.

2. Description of the Prior Art

Catalytic reaction apparatus for converting hydrocarbon fuels to useful industrial gases, such as hydrogen, are well known in the art. They are generally designed for high product gas yield. Equipment size has been generally of secondary importance since the cost to produce the product gas is a small fraction of the price of the products made from the product gas. The most common process for producing hydrogen is steam reforming a hydrocarbon fuel by passing it through heated catalyst filled reaction tubes disposed within a furnace. Typically the reaction tubes are 20–40 feet long and the primary mode (on the order of 70%) of heat transfer is by radiation from the furnace walls to the reaction tubes. This requires relatively large spacing between the tubes and placement of the tubes adjacent the walls of the furnace in order that each tube is uniformly heated by radiation from the walls. These commercial hydrogen generation plants have a very high rate of heat transfer, on the order of 20,000–25,000 Btu/hr per $jt^2$ of reaction tube surface area; however, because this type of system is primarily dependent upon radiant heat, reactor thermal efficiency is only 40–60%. Although high hydrogen conversion rates can be achieved, a large percent of the heat energy produced in the furnace leaves the furnace in the form of high temperature exhaust gases (i.e., waste heat). Thus, in order to have heating rates large amounts of fuel are burned. If the heat energy is not used in a separate process, such as to produce steam, it would have to be thrown away. Even if the waste heat is used, it is not being used to produce hydrogen, thereby reducing reactor thermal efficiency and increasing the cost of the hydrogen being produced.

Along with the development of the fuel cell power plant came the need for low cost hydrogen as fuel as well as the need for low equipment cost in order for the fuel cell power plant to compete economically with existing electricity generating equipment. These needs brought additional incentive into the marketplace to reduce the size and the operating cost of fuel processing apparatus for the generation of hydrogen from hydrocarbon fuels. Mertens U.S. Pat. No. 3,144,312 and Dantowitz U.S. Pat. No. 3,541,729 both attempt to reduce the size of reaction apparatus while also increasing thermal efficiency.

Corrigan U.S. Pat. No. 3,909,299, of common assignee with the present invention, shows a steam reforming reactor design having some desirable features, but it too is not as efficient nor can it be as compact as applicant's invention hereinafter described.

SUMMARY OF THE INVENTION

Accordingly, an object of the present invention is reaction apparatus having the capability of operating at high reactor thermal efficiencies.

A further object of the present invention is reaction apparatus which is compact.

Another object of the present invention is reaction apparatus which simultaneously is compact, has high reactor thermal efficiencies, and is capable of operating at high heating rates.

According to the present invention, a plurality of closely packed tubular reactors is disposed within a furnace which is divided into an enhanced heat transfer portion and a burner cavity. Each reactor is disposed partly within the burner cavity and partly within the heat transfer portion. Heat transfer means is disposed within the heat transfer portion around and between the reactors, the heat transfer means being constructed and arranged to provide substantially uniform and enhanced conductive, convective, and radiant heating of all the reactors.

When there are a large number of closely packed reactors within a furnace, such as catalytic steam reforming reactors for producing hydrogen, heating of the reactors uniformly poses certain problems. For example, the actual burning of the fuel produces very high temperatures and results in considerable radiant heating from the walls of the furnace. If nothing is interposed between the walls of the furnace and the reactors, radiant heating from the walls will affect those portions of the reactors which have a direct line of sight to the source of the radiant heat. Reactors adjacent the furnace wall will receive considerably more heat than other reactors; and, furthermore, each of them is heated to a much higher temperature on one side than on the other. Even if excessive radiant heating of the reactors adjacent the wall could be eliminated, there is still a general tendency for reactors which are further from the furnace wall and which are surrounded by other reactors to receive less heat. Additionally, if the heat energy within the furnace is not utilized uniformly among the reactors, the overall thermal efficiency of the reaction apparatus will suffer.

Thus, one aspect of the present invention is more uniform heating of all the reactors no matter what their position within the furnace. Another aspect is a compact design with high overall reactor thermal efficiency and high heating rates, a combination which has heretofore eluded the prior art.

In a preferred embodiment the heat transfer means is packing material disposed between and around the reactors. This packing material may be made from virtually any material which can withstand the temperatures of the furnace environment, such as metals or ceramics. The shape of the particles is not critical and may be in the form of spheres, raschig rings, saddles, pall rings, etc. These packing materials serve to improve heat distribution and the overall heat transfer coefficient by the combined mechanisms of conduction, convection, mixing, and radiation. The material may fill, for example, approximately two-thirds of the volume of the furnace, the remaining one third being the combustion volume or burner cavity of the furnace and into which a portion of the reactors extends. The packing material improves heat transfer and distribution by conduction and convection as a result of increased mixing of the gases. Radiant heating also occurs, but uniformly throughout the bed from particle to particle. This also reduces temperature differentials among reactors and circumferentially around each reactor. Thus, the reactors may be spaced closer together than the prior art, and the reaction apparatus is more efficient. Enhanced heat transfer to the reactors also permits higher heating rates without loss of efficiency; this permits the processing of larger quantities of fuel at high reactor thermal efficiency.

Closely packed reactors or reactor tubes, as that phrase is used herein and in the claims, means a non-linear array of at least three closely spaced reactors wherein the array substantially fills the burner cavity volume and the reactors are substantially uniformly distributed and substantially uniformly spaced within said burner cavity volume and are closely spaced from each other. As examples, assuming a cylindrical burner cavity, a closely packed three reactor array may be in the shape of an equilateral triangle with one reactor at each vertex; a closely packed four reactor array may be in the shape of a square with a reactor at each corner; a five tube array may comprise a central reactor surrounded by a square array of four reactors. Nine reactors might be arranged in a square array of three parallel rows of three reactors each. A 19 reactor hexagonal type array is shown in FIG. 2. In all cases at least a portion of each reactor in the array receives a substantially reduced amount of direct radiation from the burner cavity wall. For example, reactors adjacent the wall receive substantially reduced radiation on the side opposite the wall; also, portions of the reactors receive a substantially reduced amount of radiation as a result of blockage of the radiation by other reactors in the array.

Also, for the purposes of this specification and the appended claims, "burner cavity" is hereby defined as the volume of the furnace within which actual combustion occurs.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 2 is a cross-sectional view of the apparatus of FIG. 1 taken substantially along the line 2—2 of FIG. 1.

FIGS. 3 and 4 fragmentary, cross-sectional views of reactors disposed vertically in a furnace showing an alternate embodiment of the present invention; FIG. 4 is taken substantially along the line 4—4 of FIG. 3.

FIG. 5 is a fragmentary, cross-sectional view showing yet another embodiment of the present invention.

FIG. 6 is a perspective, enlarged view of one of the elements of FIG. 5.

DESCRIPTION OF THE PREFERRED EMBODIMENTS

Figure 1:
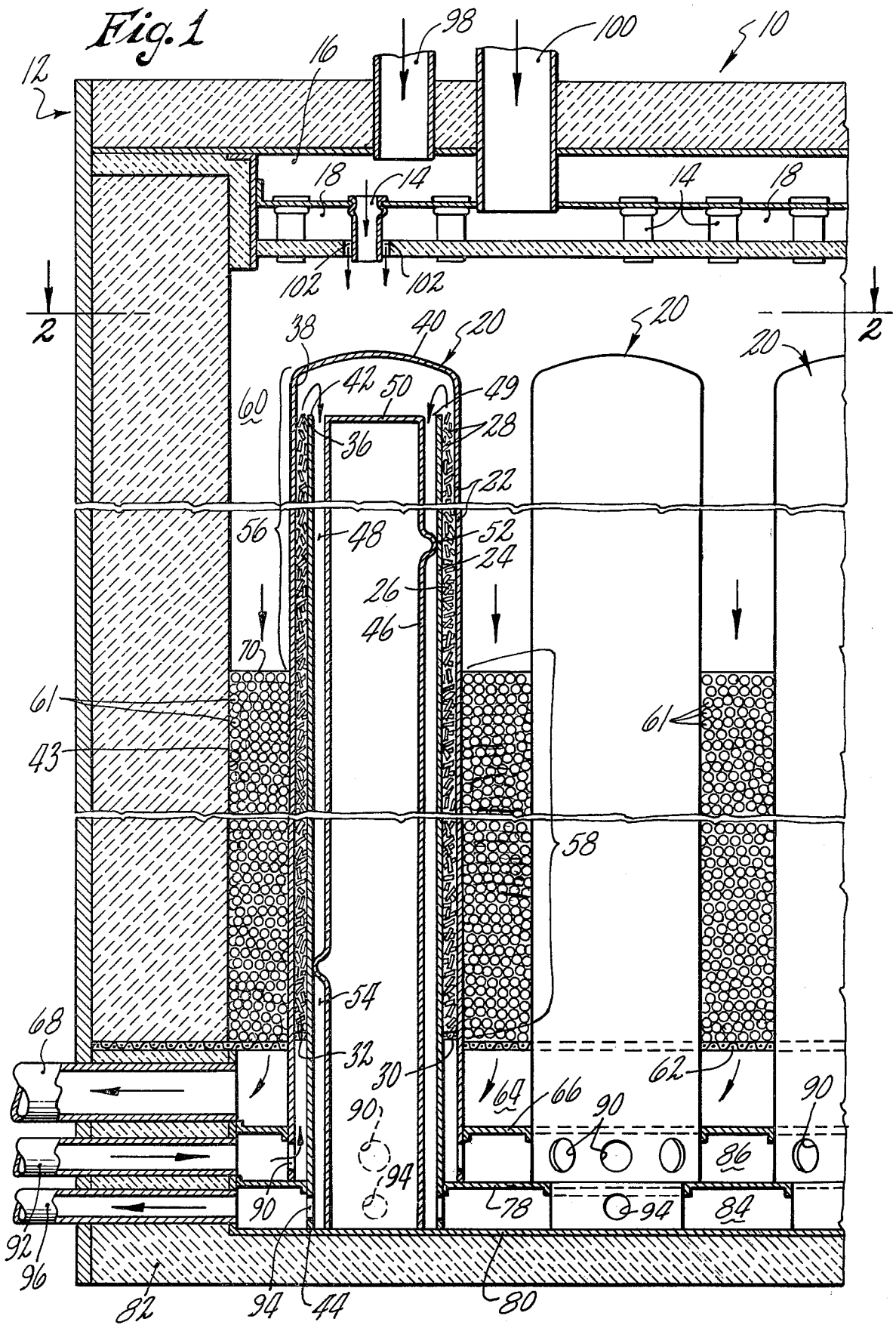
FIG. 1 is a fragmentary, vertical, cross-sectional view of catalytic reaction apparatus according to the present invention.

Consider, as an exemplary embodiment of the present invention, the catalytic reaction apparatus 10 of FIGS. 1 and 2. In this embodiment, the apparatus is for the purpose of steam reforming a reformable hydrocarbon fuel in the presence of a suitable catalyst in order to produce hydrogen. The apparatus 10 comprises a furnace 12 including burner nozzles 14, a burner fuel manifold 16, and an air manifold 18. Disposed within the furnace 12 is a plurality of closely packed tubular reactors 20.

Each reactor 20 comprises an outer cylindrical wall 22 and an inner cylindrical wall or center tube 24 defining an annular reaction chamber 26 therebetween. The reaction chamber 26 is filled with steam reforming catalyst pellets 28 which are supported on a screen 30 disposed at the inlet 32 of the reaction chamber. Any suitable steam reforming catalyst, such as nickel, may be used to fill the reaction chamber from its inlet 32 to its outlet 36. The cylinder which is defined by the outer wall 22 is closed at its upper end 38 by an end cap 40. The center tube 24 has an upper inlet end 42 and a lower outlet end 44. The inlet end 42 terminates below the end cap 40 such that the center tube is in gas communication with the outlet 36 of the reaction chamber 26.

Disposed within the center tube is a cylindrical plug 46 which has an outer diameter somewhat smaller than the inner diameter of the center tube thereby defining an annular regeneration chamber 48 therebetween having an inlet 49. The plug 46 may be a solid rod, but in this embodiment is a tube which is blocked by an end cap 50 at one end thereof such that reaction products exiting the reaction chamber 26 must flow around the plug 46 through the regeneration chamber 48. Spacing between the plug 46 and the center tube 24 is maintained by dimples 52 in the plug wall.

For the purposes of the reactors of this exemplary embodiment, the function of the regeneration chamber 48 is to return heat from the reaction products leaving the outlet 36 back into the catalyst bed of the reaction chamber 26; therefore, with regard to this embodiment, the outlet 54 of the regeneration chamber 48 is considered to be located adjacent the inlet 32 of the catalyst bed rather than at the outlet end 44 of the center tube, despite the fact that the actual annulus defined between the plug 46 and the center tube 24 extends to the outlet end 44. The arrangement shown in FIG. 1 provides some preheating of the process fuel before it enters the catalyst bed, but this is not critical to the present invention. Also, in this embodiment the plug 46 extends the entire length of the reaction chamber such that the inlet 49 of the regeneration chamber is adjacent the outlet 36 of the reaction chamber; although this is preferred for maximum regeneration, the regeneration chamber inlet may be located anywhere between the inlet and outlet of the reaction chamber by using a shorter plug.

Note that the regeneration chamber 48 is substantially isolated from the hot furnace gases. For maximum overall reactor efficiency it is important to prevent the heat energy of the furnace gas from heating the reaction products within the regeneration chamber. It is also important to avoid the burning of additional fuel or hydrogen within the regeneration chamber. Only sensible heat already in the reaction products at the outlet 36 is transferred to the reaction chamber.

Each reactor 20 may be considered to comprise an upper portion 56 and a lower portion 58. The upper portion 56 is disposed within what is hereinafter referred to as the burner cavity 60. The cavity 60 is that volume of the furnace 12 within which actual combustion of the fuel and air fed into the furnace takes place. This volume is characterized by very high temperatures, considerable radiant heating as well as convective heating of the reactors 20, an axial (i.e., in the direction of the axis of the reactors 20) as well as radial mixing of the gases therein.

The space between the lower portions 58 of the reactors is filld with a heat transfer packing material comprising particles 61, which in this embodiment are alumina spheres. The particles 61 are supported by a perforated plate 62 extending across the furnace. Particles, as that term is used herein, is not intended to designate any particular size range. Any size particles which accomplish the desired result and which do not create an excessive pressure drop through the furnace may be used.

A sufficient volume of the furnace around the upper portions 56 of the reactors remains empty for permitting combustion of the fuel and air within the furnace. This volume is the burner cavity 60. The volume of the furnace containing the heat transfer particles is herein referred to as the enhanced heat transfer portion of the furnace. The enhanced heat transfer portion communicates with a manifold 64 between a plate 66 and the plate 62. An exhaust conduit 68 is connected to the manifold 64. Actually, the heat transfer particles 61 define an interface 70 within the furnace, on one side of which is the burner cavity and on the other side of which is the enhanced heat transfer portion of the furnace. The volume of the burner cavity and the volume of the enhanced heat transfer portion is controlled by the location of the interface 70.

In addition to the plates 62 and 66, plates 78 and 80 also extend across the furnace and define manifolds therebetween. The plate 80 rests on the bottom wall 82 of the furnace. The plates 78 and 80 define a reaction products manifold 84 therebetween; and the plates 66 and 78 define a process fuel inlt manifold 86 therebetween. The plugs 46 and the center tubes 24 abut the bottom plate 80; and the outer walls 22 of the reactors abut the plate 78.

In operation, a mixture of steam and reformable hydrocarbon fuel from the manifold 86 enters the inlet 32 of the reaction chamber 26 by way of the holes 90 in the wall 22; the manifold 86 is fed by a conduit 92. The mixture immediately begins to be heated by the furnace gases flowing countercurrent thereto through the heat transfer packing material 61 and begins to react in the presence of the catalyst particles 28. As the fuel, steam, and reaction products travel upward within the reaction chamber 26 they continue to react and pick up additional heat. At the outlet 36 the temperature of the reaction products reaches a maximum. The hot reaction products enter the inlet 49 of the regeneration chamber 48. As the reaction products traverse the length of the annular regeneration chamber, heat is transferred therefrom back into the reaction chamber 26. They thereupon enter the reaction products manifold 84 through the holes 94 in the center tube 24, and are carried away from the reactor via the conduit 96 either for further processing, storage, or consumption.

Fuel for the furnace enters the manifold 16 via a conduit 98 and thereupon passes into the burner cavity 60 by way of the nozzles 14. Air enters the manifold 18 via a conduit 100 and enters the burner cavity 60 via annular passageways 102 surrounding each nozzle 14. Burning of the fuel and air takes place within the burner cavity 60. The hot gases from the burner cavity travel through the packing material of the enhanced heat transfer portion and into the manifold 64. They are exhausted via the conduit 68.

In order to meet the objects of the present invention it is desired that as much as possible of the heat energy produced within the furnace be utilized directly to produce hydrogen within the reaction chamber 26. This will result in high reactor thermal efficiency. Reactor thermal efficiency ($\eta$) is defined as follows:

$$\eta = \frac{(N_{H_2}) \cdot (LHV_{H_2})}{(F_r)(LHV_r) + F_f(LHV_f)}$$

where $N_{H_2}$ is the net amount of hydrogen produced, $LHV_{H_2}$ is the lower heating value of hydrogen, $F_r$ is the amount of process fuel fed to the reactor, $F_f$ is the amount of fuel fed to the furnace, and $LHV_r$ and $LHV_f$ are the lower heating values of the process and furnace fuel, respectively. The foregoing assumes hydrogen is the desired reaction product. The equation can readily be modified for other reaction products.

With regard to high reactor thermal efficiency, it is also necessary to have a high heat transfer effectiveness ($\epsilon$). The heat transfer effectiveness is equal to the change in enthalpy of the heating stream divided by the theoretical macimum change in enthalpy. In other words, if the heating stream has an enthalpy of $E_1$ at its inlet temperature of $T_1$ and an enthalpy of $E_2$ at its exit temperature of $T_2$, and if the heated stream has a temperature of $T_3$ at its inlet, then the heat transfer effectiveness as between the two streams is given by the following equation:

$$\epsilon = \frac{E_1 - E_2}{E_1 - E_3}$$

where $E_3$ is the enthalpy of the heating stream calculated at the temperature $T_3$.

Keep in mind that $\eta$ is approximately directly proportional to $\epsilon$, and that the heating rate is also directly proportional to $\epsilon$; therefore, high efficiency requires high heat transfer effectiveness.

Within the burner cavity 60 temperatures are so high that sufficient heat is transferred to the reaction chambers 26 despite the relatively low heat transfer coefficient in that area. However, as the burning gases give up heat to the reactors and as they move further away from the burner nozzles 14, their temperature drops. If not for the present invention, the heat transfer effectiveness would become unacceptably low and could result in a large amount of heat leaving the furnace via the conduit 68, rather than being transferred to the reaction chamber 26 where it would work directly to produce additional hydrogen. As the hot gases leave the burner cavity 60 they heat the particles 61. Heat transfer is thereby improved by enhanced convection, conduction and radiation throughout the packing material. Additionally, the particles cause circumferential and radial (i.e., perpendicular to the axes of the reactors) mixing of the gases thereby improving uniformity of temperature circumferentially around each reactor and between reactors. The improved heat distribution created by the particles permit the reactors to be spaced closer together than would otherwise be possible since close spacing generally hinders the circulation of the hot gases between the tubes. The particles 61 disposed between the furnace wall 43 and the reactors eliminate direct radiant heating from the furnace wall to those lower portions 58 of the reactors which would otherwise have a direct line of sight to the furnace wall. There is now no need to space the reactors far apart so that all of the reactors receive a share of the radiant heat from the furnace wall. Thus, the reactors can be packed close together to form a more compact reaction apparatus.

We have run a cylindrical furnace containing seven reactors arranged in an array similar to the 19 tube array shown in FIG. 2 except that a single reactor was surrounded by only one ring of six reactors. The reactors were 72 inches long and had an outer diameter of 6 inches. The packing material filled the furnace volume to the extent that it covered approximately 50% of the length of the reactors. The packing material comprised ceramic saddles having a nominal dimension of about 1.0 inch. Spacing between the outer walls of adjacent reactors was 2.0 inches. Reactor thermal efficiencies as high as 87% were obtained with heating rates on the outer of 12,000 Btu/hr/ft$^2$.

Another embodiment of the present invention is shown in FIGS. 3 and 4. The same reference numerals as used in FIGS. 1 and 2 are used in FIGS. 3 and 4 to designate the same elements. In this embodiment axially entending flow directors 200 are disposed within the enhanced heat transfer portion of the furnace. They are generally triangular in cross section and are positioned at what may be considered the space between and common to every three adjacent reactors. They take up space which would otherwise be occupied by thermally conducting particles 61. The flow directors 200 force the flow of furnace gases between themselves and the reactors. Thus, the effective volume of the enhanced heat transfer portion is reduced and the flow of hot gases is driceted more nearly adjacent the reactors thereby increasing heat transfer effectiveness. The flow directors 200 are preferably made from a thermally nonconductive material so that heat will not travel axially therethrough and shortcircuit the reactors.

FIGS. 5 and 6 show yet another embodiment of the present invention. In this embodiment flow directors 210 are provided with a plurality of integral fins 212 extending the length thereof. The fins 212 take the place of the thermally conductive particles 61 described hereinabove with regard to the first two embodiments. As shown in FIG. 6, the fins 212 are slotted as at 214 over their length to permit circumferential circulation of the gases within the enhanced heat transfer portions of the furnace. This is consistent with the object of the present invention which is to provide both circumferential uniformity of temperature around each tube as well as more nearly equivalent temperatures in all tubes at any axial location with the enhanced heat transfer portion of the furnace.

Although not shown in any of the figures, means should be provided to prevent fluidization of the catalyst bed as a result of the upward flowing process gas. For example, the anti-fluidization means described in commonly owned, copending U.S. patent application Ser. No. 753,336 titled "Upflow Catalytic Reaction Apparatus With Anti-fluidization Means" by R. Masters, R. Sederquist, and D. Szydlowski filed on Dec. 22, 1976 could be used, and is incorporated herein by reference.

It should also be apparent that the invention is not limited to steam reforming hydrocarbon fuels to produce hydrogen. The heat transfer concepts upon which the invention is based could apply equally well to other endothermic catalytic reactions.

The teachings of several other commonly owned, copending U.S. patent applications filed on Dec. 22, 1976 may also be incorporated into the apparatus of the present invention if desired. These applications are: U.S. Ser. No. 753,341 "Improved Steam Reforming Process and Apparatus Therefor" by R. Sederquist, now U.S. Pat. No. 4,071,330 and U.S. Ser. No. 753,335 "Compact Multi-tube Catalytic Reaction Apparatus" by G. Krar, O. Olesen, R. Sederquist, and D. Szydlowski now abandoned.

Another commonly owned, copending U.S. patent application not heretofore mentioned and having subject matter related to the present invention is U.S. Ser. No. 753,348 "Catalytic Reaction Apparatus" by R. Buswell, R. Sederquist, and D. Snopkowski, also filed on Dec. 22, 1976 now abondoned.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. Catalytic reaction apparatus comprising:

a furnace including wall means defining a furnace volume, said volume consisting essentially of an enhanced heat transfer portion and a burner cavity, said furnace also including exhaust means associated with said heat transfer portion and means for introducing fuel and an oxidant into said burner cavity;

a plurality of closely packed tubular reactors disposed within said furnace volume each including a first portion extending into said burner cavity and a second portion disposed within said enhanced heat transfer portion, each of said reactors requiring heat to be supplied thereto and including catalyst disposed therein, each of said reactors including an outer wall and an inner wall, said inner wall spaced from said outer wall defining an annular reaction chamber therebetween for holding said catalyst, said reaction chamber having an inlet end and an outlet end, said outlet end being disposed in said first portion, said apparatus also including means spaced inwardly from said inner wall of each of said reactors and defining a narrow annular heat regeneration chamber therebetween coaxial with and adjacent said annular reaction chamber, said annular regeneration chamber having an inlet end and an outlet end, each of said reactors including means for directing reaction products from said reaction chamber outlet end into said regeneration chamber inlet end and through said regeneration chamber countercurrent to the flow in said reaction chamber, said regeneration chamber being substantially isolated from heat in the burner cavity and enhanced heat transfer portion;

means for introducing process fuel into said reactors;

means for conducting reaction products away from said reactors; and heat transfer means disposed within said volume around and between said reactors substantially filling said enhanced heat transfer portion and defining an interface between said enhanced heat transfer portion and said burner cavity, said heat transfer means being further constructed and arranged to enhance heat transfer to said reactors and to distribute heat uniformly among and around said reactors over that portion thereof which is disposed within said enhanced heat transfer portion, said furnace being constructed and arranged so that furnace gases travel from said burner cavity into and through said enhanced heat transfer portion in a direction substantially countercurrent to the flow in said reaction chamber, and from said heat transfer portion to said furnace exhaust means.

2. The reaction apparatus according to claim 1 wherein said heat transfer means consists of particles of heat transfer packing material disposed within the space between said reactors filling said enhanced heat transfer portion of said furnace.

3. The reaction apparatus according to claim 1 wherein said apparatus is steam reforming apparatus and said catalyst is steam reforming catalyst, and wherein said means for introducing process fuel into said reactors includes means for introducing steam and process fuel into said reactors.

4. The reaction apparatus according to claim 1 including flow directors disposed within said enhanced heat transfer portion, extending parallel to said reactors, and spaced therefrom, for reducing the furnace volume adjacent said reactors through which the furnace gases flow, said heat transfer means being disposed between said flow directors and said reactors.

5. The reaction apparatus according to claim 4 wherein said heat transfer means consists of heat transfer packing particles.

6. The reaction apparatus according to claim 4 wherein said heat transfer means comprises a plurality of heat transfer fins extending outwardly from said flow directors over the length thereof.

* * * * *

UNITED STATES PATENT AND TRADEMARK OFFICE
CERTIFICATE OF CORRECTION

PATENT NO. : 4,098,588
DATED : July 4, 1978
INVENTOR(S) : Buswell et al

It is certified that error appears in the above-identified patent and that said Letters Patent are hereby corrected as shown below:

Column 1, line 12, "aparatus" should read --apparatus--.

Column 1, line 34, "jt$^2$" should read --ft$^2$--.

Column 3, line 43, after "FIGS. 3 and 4" insert --are--.

Column 4, line 62, "filld" should read --filled--.

Column 5, line 26, "inlt" should read --inlet--.

Column 6, line 19, "macimum" should read --maximum--.

Column 7, line 13, "outer" should read --order--.

Column 7, line 18, "entending" should read --extending--.

Column 7, line 28, "driceted" should read --directed--.

Signed and Sealed this

Thirteenth Day of February 1979

[SEAL]

Attest:

RUTH C. MASON
Attesting Officer

DONALD W. BANNER
Commissioner of Patents and Trademarks